(12) United States Patent
Cohen et al.

(10) Patent No.: US 7,574,038 B1
(45) Date of Patent: Aug. 11, 2009

(54) METHOD AND APPARATUS FOR DETERMINING THE BACKGROUND OF AN IMAGE SEQUENCE

(75) Inventors: Scott Cohen, Mountain View, CA (US); Martin E. Newell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 868 days.

(21) Appl. No.: 11/096,998

(22) Filed: Mar. 31, 2005

(51) Int. Cl.
*G06K 9/00* (2006.01)
*G06K 9/20* (2006.01)

(52) U.S. Cl. ...................................... 382/163; 382/282

(58) Field of Classification Search ................ 382/163, 382/164, 162, 173, 282, 286; 358/1.9, 453, 358/462
See application file for complete search history.

(56) References Cited

U.S. PATENT DOCUMENTS

| | | | |
|---|---|---|---|
| 4,809,349 A | 2/1989 | Herby et al. | |
| 5,282,061 A | 1/1994 | Farrell | |
| 5,481,620 A | 1/1996 | Vaidyanathan | |
| 5,524,069 A | 6/1996 | Inoue | |
| 5,579,409 A | 11/1996 | Vaidyanathan | |
| 5,608,820 A | 3/1997 | Vaidyanathan | |
| 5,699,452 A | 12/1997 | Vaidyanathan | |
| 5,982,943 A | 11/1999 | Hsu et al. | |

OTHER PUBLICATIONS

Gordon, et al., "Background estimation and removal based on range and color", IEEE Conference on computer vision and pattern recognition, vol. II, pp. 459-464, 1999.
Gutchess, "A background model initialization algorithm for video surveillance", IEEE, 2001.
Farin, "Robust background estimation for complex video sequences", IEEE International conference on image processing, vol. 1, 2003.

*Primary Examiner*—Yon Couso
(74) *Attorney, Agent, or Firm*—Robert C Kowert; Meyertons, Hood, Kivlin, Kowert & Goetzel, P.C.

(57) ABSTRACT

One embodiment of the present invention provides a system that determines a background image for a sequence of image frames. During operation, the system receives a sequence of input image-frames, wherein an input image-frame associates pixels with pixel-attributes. The system then computes a labeling, wherein the labeling associates pixels in the output background image with input image-frames in the sequence of input image-frames. Next, the system determines the output background image using the sequence of input image-frames and the labeling.

17 Claims, 3 Drawing Sheets

METHOD AND APPARATUS FOR DETERMINING THE BACKGROUND OF AN IMAGE SEQUENCE

FIELD OF THE INVENTION

The present invention relates to techniques for determining the background of an image sequence. More specifically, the present invention relates to a method and an apparatus for determining the background of a sequence of image frames by formulating a labeling problem in which each pixel is labeled with an image frame number.

BACKGROUND

Related Art

As computer systems become more powerful, they are being used for increasingly computationally intensive image-processing tasks. One such task is "background estimation." The goal of background estimation is to construct the background of an image sequence by eliminating the moving objects from the scene. Background estimation is used in many image processing applications, such as, video surveillance, traffic monitoring, object tracking, graphical special effects, detection and recognition of events and actions, and semantic annotation of video.

Note that the background estimation problem is complicated by camera motion, scene brightness changes, etc. Even if we remove these complicating factors, the background estimation is still a very difficult problem because the background in some areas might only be visible for a small percentage of time.

Present techniques for background estimation suffer from a number of drawbacks. For example, the popular median based approach sets the background estimate equal to the median of the input frames. Unfortunately, this approach is not general enough because it requires that the background be visible for at least half the time. Similarly, depth based techniques require two input sequences to compute depth. Unfortunately, only one input sequence is usually available.

Note that background estimation techniques can be used to improve the accuracy of optical flow computations, leading to better frame interpolation for applications such as retiming and slow motion. Unfortunately, for such applications, background estimation techniques that use an optical flow based technique result in a circular dependency, and hence, are not preferred.

Hence, what is needed is a method and an apparatus for determining the background of a sequence of image frames without the above-described problems.

SUMMARY

One embodiment of the present invention provides a system that determines a background image for a sequence of image frames. During operation, the system receives a sequence of input image-frames, wherein an input image-frame associates pixels with pixel-attributes. The system then computes a labeling, wherein the labeling associates pixels in the output background image with image-frames in the sequence of input image-frames. Next, the system determines the output background image using the sequence of input image-frames and the labeling.

In a variation on this embodiment, the system determines the background image by computing a pixel-attribute for a pixel in the background image. Specifically, the system computes the pixel-attribute by: identifying a set of input image-frames associated with the pixel based on the labeling; identifying a set of pixel-attributes associated with the pixel from the identified set of input image-frames; and computing the pixel-attribute for the pixel based on the identified set of pixel-attributes.

In a variation on this embodiment, a pixel-attribute associated with a pixel can be the pixel's color or intensity.

In a variation on this embodiment, the system computes the labeling by formulating a labeling problem such that a substantially optimal solution to the labeling problem results in a good estimate of the background image.

In a further variation on this embodiment, the cost function of the labeling problem includes a component that measures a variance of a pixel-attribute over the sequence (or some portion thereof) of input images, wherein a good estimate of the background image results in a low variance.

In a further variation on this embodiment, the cost function of the labeling problem includes a component that measures a motion boundary consistency which indicates whether motion boundaries are consistent with image intensity edges, wherein a good estimate of the background image results in a high degree of motion boundary consistency.

In a further variation on this embodiment, the cost function of the labeling problem includes a component that measures smoothness of pixel-attributes associated with adjacent pixels, wherein a good estimate of the background image results in a high degree of smoothness. In other words, two adjacent pixels have a high degree of smoothness if the image-frames that the labeling associates with these pixels match well in the proximity of the pixel locations.

DETAILED DESCRIPTION

Figure 1:
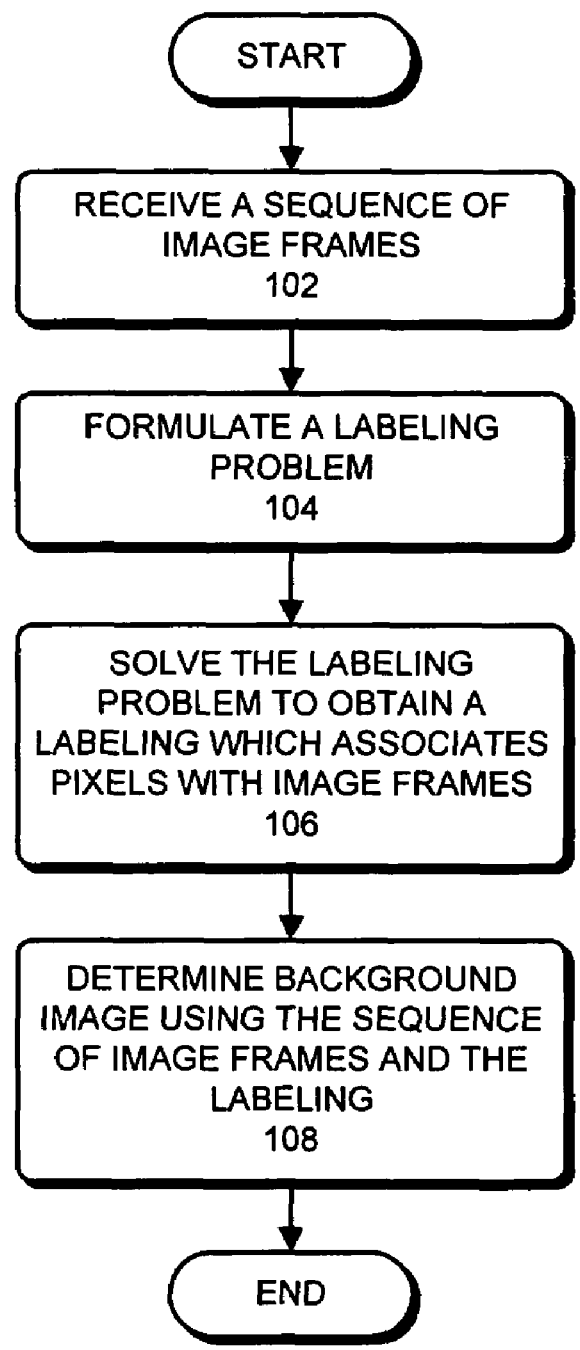
FIG. 1 presents a flowchart that illustrates a process for determining a background image in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Background Estimation Problem

The goal of background estimation is to construct the background of an image sequence by eliminating the moving objects from the scene. Background estimation is used in many image processing applications, such as, video surveillance, traffic monitoring, object tracking, graphical special effects, detection and recognition of events and actions, and semantic annotation of video.

Note that the background estimation problem is complicated by camera motion, scene brightness changes, etc. Even if we remove these complicating factors, the problem is still very difficult because the background in some areas might only be visible for a small percentage of time.

There are a number of techniques for solving the background estimation problem. The popular median based approach sets the background estimate equal to the median of the input frames. Note that this approach does not always work because it assumes that the background is visible for at least half the time. A variation on this approach uses the mode (instead of the median) of the distribution of colors over time at a pixel. Unfortunately, this approach is also not general enough because it assumes that the background color is visible more often than any other color that occluded it, which might not be the case due to an object that was temporarily still or a moving object that has a roughly uniform color area within it.

Some background estimation techniques are based on the following insight: since the background is static, a good candidate frame for the background color at a pixel is one for which the color at that pixel remains approximately the same in nearby frames. But, unless there is only one period of stationary color at a pixel, this approach can lead to ambiguity in choosing the correct stationary color. Note that the background estimation problem can be solved by removing (a) objects that are not always moving, and (b) moving objects that have textureless areas. Unfortunately, since both these cases result in stationary colors where there is an object to be removed, they can cause such "stationariness" based approaches to fail.

Certain background estimation techniques add information to the raw color data to disambiguate the correct background color from the set of candidate colors. One such technique uses depth information to determine the background. Unfortunately, depth based techniques require two input sequences to compute depth, which are typically not available.

Furthermore, techniques that use optical flow computation are based on the following insight: motion information can be used to label an intensity transition as foreground to background or background to foreground, and hence, can be used to choose among candidate background intensities at a pixel. Note that optical flow computations are used in a variety of image processing applications. Moreover, note that, background estimation can be used to improve the accuracy of optical flow computations, which can lead to better frame interpolation for applications such as retiming and slow motion. Unfortunately, if the background estimation technique itself uses an optical flow computation, the resulting background estimate is not preferred to improve the accuracy of the optical flow.

Overview

One embodiment of the present invention uses color stationariness as a background hint, but we add the assumption that motion boundaries are a subset of intensity edges to resolve raw color data ambiguities. This additional information is able to disambiguate the background color from a set of candidate colors without the need to solve difficult problems such as optical flow and depth from stereo. Moreover, the penalty for violating these assumptions works just the same with small or large inter-frame motion of objects. This is another potential advantage over computing optical flow which is typically used in situations with small inter-frame motion of objects.

In one embodiment, the background image is constructed by copying areas from input frames. Specifically, the problem is formulated as a standard minimum cost labeling problem in which the label of a pixel is the frame number from which the background color is copied. Note that casting the background estimation problem as a minimum cost labeling problem enables us to use existing energy minimization techniques such as graph cut-based techniques and belief propagation based techniques.

Furthermore, in one embodiment the cost function encourages seamless copying from areas of stationary color in such a way that implied motion boundaries between the background and moving objects occur at intensity edges. Moreover, the cost function has terms that discourage copying from regions that contain objects that were in motion at some time.

In summary, we are given a sequence of images of a scene. For each pixel, we seek to find an input frame that has background visible at that pixel. This allows us to construct an estimate of the background of the scene by simply copying pixel colors from input frames. Formally, each pixel is labeled with a frame number from which to copy the background color. Furthermore, each labeling of pixels is assigned a cost such that the cost is substantially minimized by a labeling that generates a good estimate of the scene background. Specifically, the cost of a labeling is built from the cost of assigning a label to a single pixel and the cost of assigning a pair of labels to a pair of neighboring pixels. The single pixel cost is composed of two cost components. One component penalizes copying from a location that does not have a stationary color over some time interval. A second component penalizes labelings for which a subsequent background subtraction process would place a motion boundary where there is no intensity edge. The cost component that assigns a cost to a pair of neighboring pixels penalizes a copying switch from one frame to another where the two frames do not match well. Note that, if there is camera motion, the backgrounds of the input frames are aligned before applying our labeling solution (for further details of techniques for aligning input frames see J. Davis "*Mosaics of scenes with moving objects*," CVPR, pp. 354-360, 1998).

Process of Determining a Background Image

FIG. 1 presents a flowchart that illustrates a process for determining a background image in accordance with an embodiment of the present invention.

The process begins by receiving a sequence of input image frames (step 102). Note that an image frame associates a pixel with a pixel-attribute, such as, the pixel's color or intensity.

Figure 2:
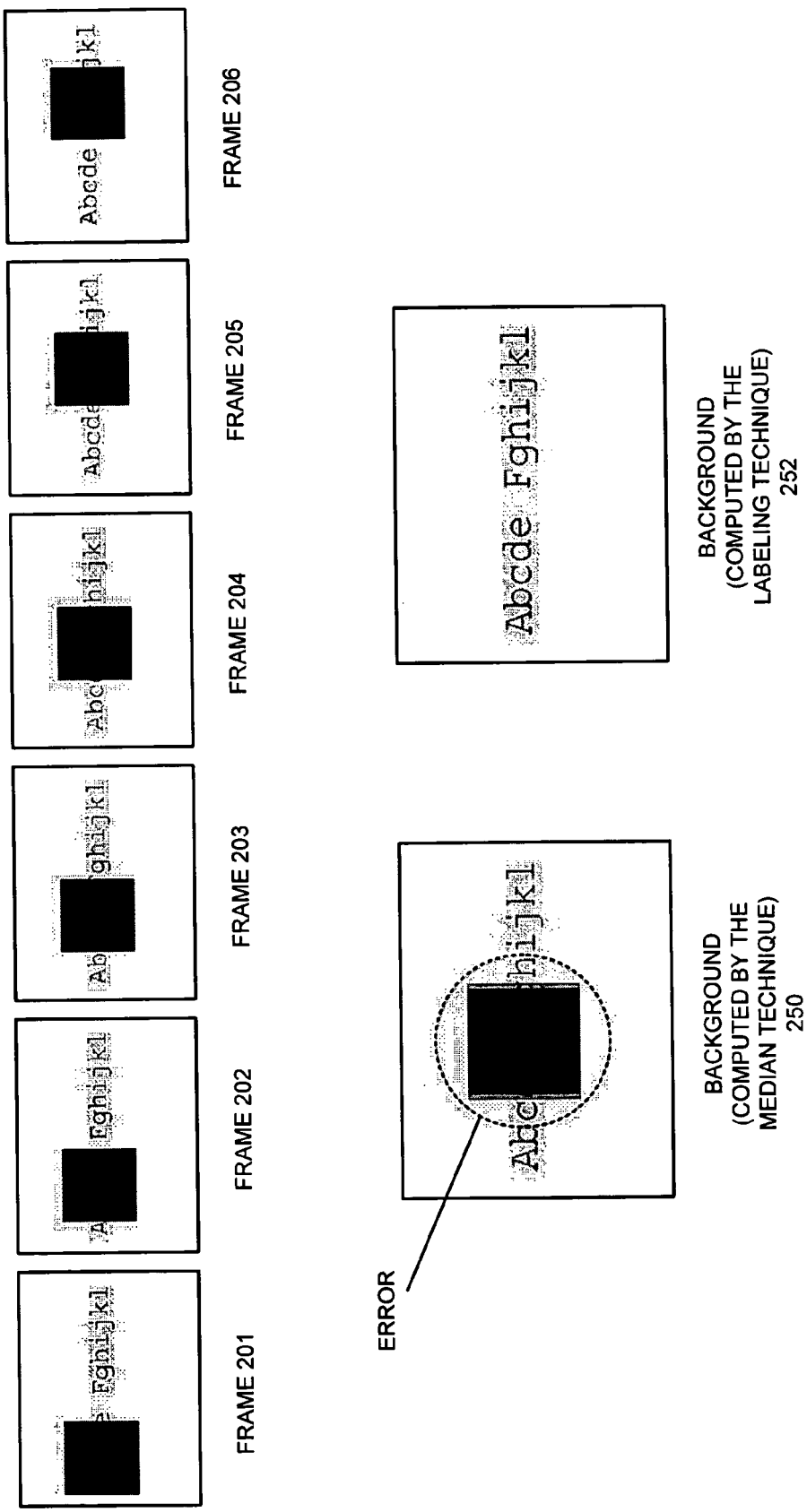
FIG. 2 illustrates an exemplary sequence of image frames and background images computed using different background estimation techniques in accordance with an embodiment of the present invention.

Specifically, FIG. 2 illustrates an exemplary sequence of image frames and background images computed using different background estimation techniques in accordance with an embodiment of the present invention.

Image frames 201, 202, 203, 204, 205, and 206 depict a scene in which a box moves over printed text. In this case, the correct background image contains the printed text, but does not contain the moving box.

The system then computes a labeling, wherein the labeling associates pixels in the background image with input image frames in the sequence of input image frames.

Specifically, the system first formulates a labeling problem (step 104).

Formally, let $I_1, I_2, \ldots, I_F$ denote the F input frames, P be the set of pixels in a frame, and $I_f(p)$ be the color of pixel p∈P in frame f. Note that the set $\Phi = \{f_p\}_{p \in P}$ denotes a labeling of the output (i.e. background) pixels with frame numbers from which to copy. The background image $I_B$ is formed by copying the color at pixel p from input frame $f^*_p$: $I_B(p) = I_{f^*_p}(p)$, where $\{f^*_p\}$ is a substantially optimal labeling.

The cost or energy $E(\Phi)$ of a labeling $\Phi$ is given by:

$$E(\Phi) = \sum_{p \in P} D_P(f_P) + \sum_{(p,q) \in N} V_{pq}(f_p, f_q),$$

where N is the set of pairs of neighboring pixels, $D_p(f_p)$ is the cost of assigning label $f_p$ to pixel p, while $V_{pq}(f_p, f_q)$ is the cost of assigning labels $f_p$ and $f_q$ to neighboring pixels p and q, respectively.

The cost component $D_p(f_p)$, in turn, is given by:

$$D_p(f_p) = D_p^S(f_p) + \beta \cdot D_p^C(f_p),$$

where $D_p^S(f_p)$ accounts for color stationariness, $D_p^C(f_p)$ accounts for motion boundary consistency, and β is a free parameter.

The stationariness cost $D_p^S(f_p)$ is based on the variance of the colors $I_f(p)$ over frames f close to frame $f_p$. Specifically, let $Var_{f_1 f_2}(p)$ denote the average of the component variances of the colors $I_f(p)$ from frame $f_1$ to frame $f_2$. Then $D_p^S(f_p) = \min\{Var_{f_p - r, f_p}(p), Var_{f_p, f_p + r}(p)\}$, where r is the number of frames forward and backward that are considered for judging stationariness.

The intuition behind the consistency cost $D_p^C(f_p)$ can be explained as follows: suppose that frame $f_p$ were the background image and frame f was some other frame. The difference image $M_{f_p f} = \|I_{f_p} - I_f\|_2$ has a large gradient magnitude $\|\nabla M_{f_p f}\|_2$ where $I_{f_p}$ and $I_f$ change from matching well to matching poorly. Such locations are exactly where a background subtraction process would place a motion boundary in frame f if frame $f_p$ were the background image. Hence, we want cost component $D_p^C(f_p)$ to penalize locations with large motion gradient but small intensity gradient. In one embodiment, $D_p^C(f_p)$ is given by:

$$D_p^C(f_p) = \frac{1}{F} \sum_{f=1}^{F} \Omega_{f_p f}(p)$$

$$\Omega_{f_p f}(p) = \frac{\|\nabla M_{f_p f}(p)\|_2^2}{\|\nabla I_f(p)\|_2^2 + \varepsilon^2}$$

Note that the frame consistency cost $\Omega_{f_p f}(p)$ is large if and only if labeling pixel p with frame $f_p$ implies a motion boundary in frame f where there is no intensity edge in frame f. Adding a small $\varepsilon^2$ term in the denominator of the expression for $\Omega_{f_p f}(p)$ ensures that zero motion gradient and zero intensity gradient results in zero cost for $\Omega_{f_p f}(p)$.

Figure 3:
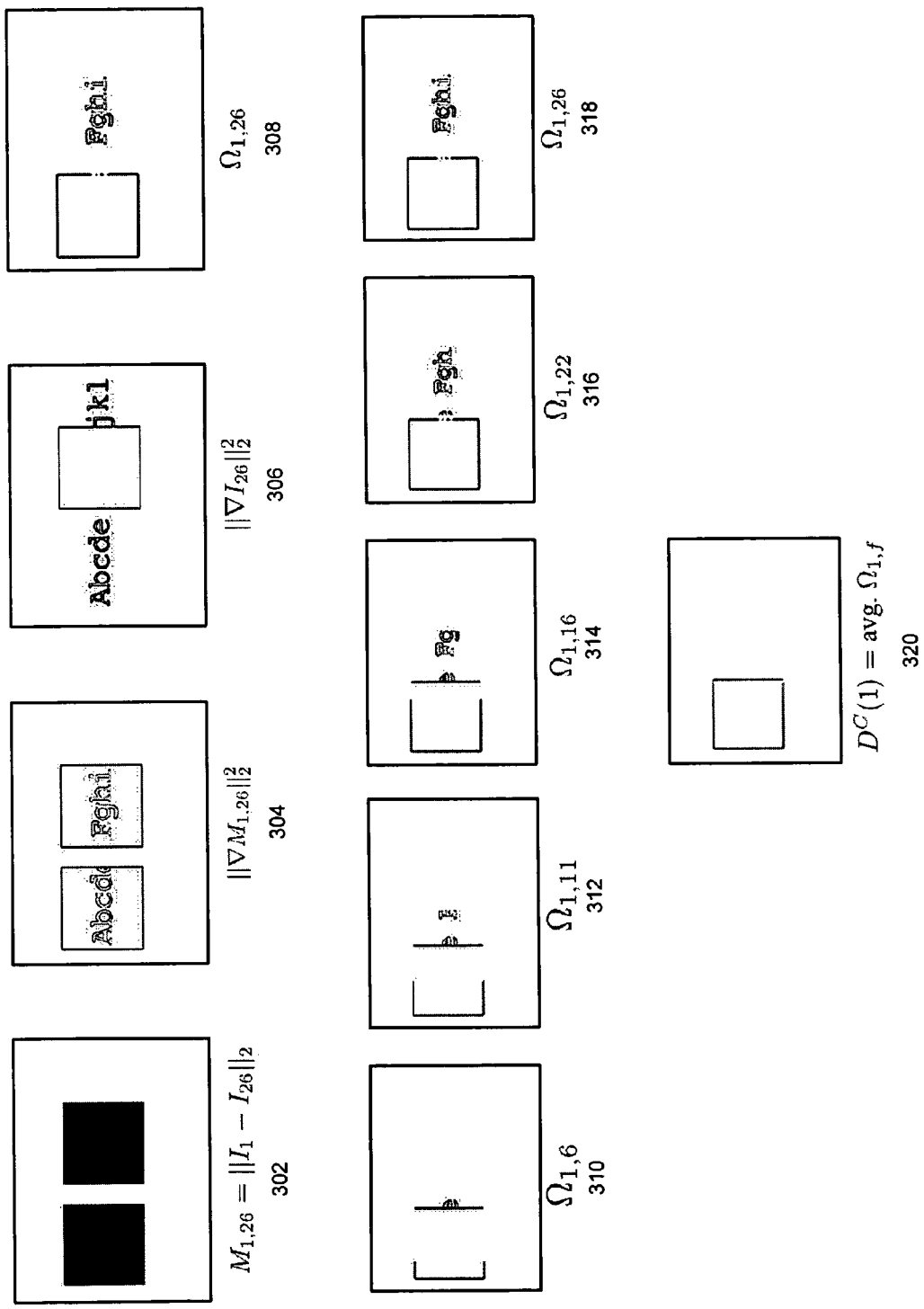
FIG. 3 illustrates components of the motion boundary consistency cost in accordance with an embodiment of the present invention.

FIG. 3 illustrates components of the motion boundary consistency cost in accordance with an embodiment of the present invention.

Images 302, 304, 306, and 308 illustrate various cost components during the computation of $D_p^C(f_p)$. These images have been computed assuming candidate background frame $f_p$ is the 1st image frame 201 and f is the 26th image frame 206, i.e., $f_p = 1$ and $f = 26$. Furthermore, note that "white" indicates low cost whereas "black" indicates a high cost. For example, the border of the square in frame 1 and the borders of the background letters "Fghi" are marked as inconsistent because those borders are implied motion boundaries in frame 26 where there are no intensity edges. Image 308 illustrates the value of the consistency costs for f=26.

Note that the cost $D_p^C(f_p)$ is computed as the average of the consistency costs for all the frames. Accordingly, images 310, 312, 314, 316, and 318 illustrate the consistency costs for different values of f. Note that, as the square moves, the borders of different letters are marked as inconsistent by $\Omega_{1,f}$. However, each $\Omega_{1,f}$ contains the border of the square in frame 1 minus the border of the square in frame f. As a result, when we take the average over all the frames, $D^C(1)$ is large only along the border of the square in frame 1 as shown in image 320. (Note that although the costs at the letter borders are positive, they are very small relative to the costs around the border of the square). Hence, as intended, copying the background from an area in the first frame that overlaps the moving square incurs a large cost.

The cost component that assigns costs to pairs of neighboring pixels is given by:

$$V_{pq}(f_p, f_q) = \lambda \cdot \left[ \frac{\|I_{f_p}(p) - I_{f_q}(p)\|_2^2 + \|I_{f_p}(q) - I_{f_q}(q)\|_2^2}{2 \cdot C} \right],$$

where C is the number of color planes.

Note that $V_{pq}(f_p, f_q)$ is small where frames $f_p$ and $f_q$ match well. This includes background areas that are visible in both frames. In contrast, if we use a constant cost when $f_p \neq f_q$, then we penalize a copying switch to another frame even when the presence of a moving object gives a good reason to switch. Note that the cost $V_{pq}(f_p, f_q)$ is likely to be high in an area that contains a moving highly textured object. On the other hand, untextured and temporarily still objects will have a low $V_{pq}(f_p, f_q)$ and stationariness cost $D_p^S(f_p)$. Furthermore, we rely on the consistency cost $D_p^C$ to avoid cutting through objects to be removed. The free parameters β and λ are used to trade off the importance of enforcing stationariness, consistency of motion boundaries, and seamless cutting.

Note that, if the camera is not static, then $I_f(p)$ represents the input frames after alignment and P is the set of aligned pixels covered by at least one frame. Furthermore, the variance and average are computed only over aligned frames that contain p.

Continuing with the flowchart of FIG. 1, the system then solves the labeling problem to obtain a labeling which associates pixels with image frames (step 106).

Note that the labeling problem is a well known problem in optimization theory. As a result, a number of techniques can be used to solve the labeling problem formulated in step 104.

Specifically, in one embodiment, the system determines a labeling by minimizing energy $E(\Phi)$ using techniques described in Boykov et al., "Fast approximate energy minimization via graph cuts," ICCV, pp. 377-384, 1999 (hereinafter "Boykov").

The system starts by initializing all labels to 1. The system then iterates through all possible labels α, determining whether the current labeling can be improved by changing some pixels to have label α. Such a change is called an α-expansion. The iteration stops when no further improvement can be made for any label. For each α-expansion, a minimum cut graph problem is constructed so that cuts are in one-to-one correspondence with possible α-expansions and the cost of the minimum cut is equal to the energy after performing the best possible α-expansion. The latter property requires that the "V" function obey the triangle inequality.

Unfortunately, the "V" function described above, $V_{pq}(f_p, f_q)$, does not obey the triangle inequality. But, we still use the expansion technique. In this situation, the minimum cut still represents a valid α-expansion, but the cost of the minimum cut is not in general the energy of the corresponding labeling. Hence, we modify the expansion technique to explicitly compute the energy of the minimum cut labeling to judge whether an α-expansion can lower the energy. Further, note that the labeling corresponding to the minimum cut is not necessarily the optimal α-expansion.

In another embodiment, the system minimizes energy $E(\Phi)$ using swap-based techniques described in Boykov, which attempt to lower the energy by swapping pixels labeled $\alpha_1$ to have label $\alpha_2$ and vice-versa. The swap technique does not require that $V_{pq}(f_p, f_q)$ obey the triangle inequality to find the best possible swap move at each iteration.

In yet another embodiment, the system applies the unmodified expansion technique to the square root of $V_{pq}(f_p, f_q)$, which would then satisfy the triangle inequality.

Next, the system determines the background image using the sequence of input image frames and the labeling (step 108).

Specifically, the system computes a pixel-attribute for a pixel in the background image by: identifying a set of input image-frames associated with the pixel based on the labeling; identifying a set of pixel-attributes associated with the pixel from the identified set of input image-frames; and computing the pixel-attribute for the pixel in the background image based on the identified set of pixel-attributes.

In particular, in one embodiment, the system forms the background image $I_B$ by copying the color at pixel p from input frame $f^*_p: I_B(p) = I_{f^*_p}(p)$, where $\{f^*_p\}$ is a substantially optimal labeling.

In another embodiment, the system determines a pixel attribute for a pixel in the background image by using a set of pixel attributes obtained from the sequence of images and the labeling. Specifically, in one embodiment, the system first determines a set of pixel attributes by identifying image-frames that have similar attribute values for the pixel. Next, the system computes the attribute value for the pixel based on the set of attribute values. Note that the system can use a variety of techniques to compute the attribute value from the set of attribute values. For example, in one embodiment, the system can compute the median of the set of attribute values to determine the attribute value for the pixel in the background image. Additionally, note that a pixel attribute can be a multidimensional entity.

Image 252 of FIG. 2 illustrates a sample background image determined by an embodiment of the present invention. Note that the system correctly determined the background by removing the moving box shown in image frames 201, 202, 203, 204, 205, and 206.

Image 250 illustrates a sample background image determined by an embodiment of the popular median based approach. Note that this approach was unable to correctly determine the background image.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a background image for a sequence of image frames, the method comprising:
performing the following on a computer:
receiving a sequence of input image-frames, wherein an input image-frame associates pixels with pixel-attributes;
computing a labeling, wherein the labeling associates pixels in the background image with input image-frames in the sequence of input image-frames, and wherein said computing comprises formulating a labeling problem and determining a solution for the labeling problem, wherein the labeling problem comprises a cost function; and
determining the background image using the sequence of input image-frames and the labeling.

2. The method of claim 1, wherein determining the background image involves computing a pixel-attribute for a pixel in the background image by:
identifying a set of input image-frames associated with the pixel based on the labeling;
identifying a set of pixel-attributes associated with the pixel from the identified set of input image-frames; and
computing the pixel-attribute for the pixel based on the identified set of pixel-attributes.

3. The method of claim 1, wherein a pixel-attribute associated with a pixel comprises one or more of the pixel's color or intensity.

4. The method of claim 1, wherein the cost function of the labeling problem includes a component that measures a variance of a pixel-attribute over the sequence of input images, wherein a good estimate of the background image results in a low variance.

5. The method of claim 1, wherein the cost function of the labeling problem includes a component that measures a motion boundary consistency which indicates whether motion boundaries are consistent with image intensity edges, wherein a good estimate of the background image results in a high degree of motion boundary consistency.

6. The method of claim 1, wherein the cost function of the labeling problem includes a component that measures smoothness of adjacent pixels, wherein adjacent pixels have a high degree of smoothness if the image-frames that the labeling associates with these pixels match well in the proximity of the pixel locations.

7. A computer-readable storage device storing instructions that when executed by a computer cause the computer to perform a method for determining a background image for a sequence of image frames, the method comprising:
receiving a sequence of input image-frames, wherein an input image-frame associates pixels with pixel-attributes;
computing a labeling, wherein the labeling associates pixels in the background image with input image-frames in the sequence of input image-frames, and wherein said computing comprises formulating a labeling problem and determining a solution for the labeling problem wherein the labeling problem comprises a cost function; and
determining the background image using the sequence of input image-frames and the labeling.

8. The computer-readable storage device of claim 7, wherein determining the background image involves computing a pixel-attribute for a pixel in the background image by:
  identifying a set of input image-frames associated with the pixel based on the labeling;
  identifying a set of pixel-attributes associated with the pixel from the identified set of input image-frames; and
  computing the pixel-attribute for the pixel based on the identified set of pixel-attributes.

9. The computer-readable storage device of claim 7, wherein a pixel-attribute associated with a pixel comprises one or more of the pixel's color or intensity.

10. The computer-readable storage device of claim 7, wherein the cost function of the labeling problem includes a component that measures a variance of a pixel-attribute over the sequence of input images, wherein a good estimate of the background image results in a low variance.

11. The computer-readable storage device of claim 7, wherein the cost function of the labeling problem includes a component that measures a motion boundary consistency which indicates whether motion boundaries are consistent with image intensity edges, wherein a good estimate of the background image results in a high degree of motion boundary consistency.

12. The computer-readable storage device of claim 7, wherein the cost function of the labeling problem includes a component that measures smoothness of adjacent pixels, wherein adjacent pixels have a high degree of smoothness if the image-frames that the labeling associates with these pixels match well in the proximity of the pixel locations.

13. A computer comprising:
  a computer-readable storage device storing instructions that when executed by the computer cause the computer to perform a method for determining a background image for a sequence of image frames, the method comprising:
    receiving a sequence of input image-frames, wherein an input image-frame associates pixels with pixel-attributes;
    computing a labeling, wherein the labeling associates pixels in the background image with input image-frames in the sequence of input image-frames, and wherein said computing comprises formulating a labeling problem and determining a solution for the labeling problem, wherein the labeling problem comprises a cost function; and
    determining the background image using the sequence of input image-frames and the labeling.

14. The computer of claim 13, wherein the determining comprises:
  identifying a set of input image-frames associated with a pixel in the background image based on the labeling;
  identifying a set of pixel-attributes associated with the pixel from the identified set of input image-frames; and
  computing the pixel-attribute for the pixel based on the identified set of pixel-attributes.

15. The computer of claim 13, wherein a pixel-attribute associated with a pixel comprises one or more of the pixel's color or intensity.

16. The computer of claim 13, wherein the cost function of the labeling problem includes:
  a component that measures a variance of a pixel-attribute over the sequence of input images, wherein a good estimate of the background image results in a low variance;
  a component that measures a motion boundary consistency which indicates whether motion boundaries are consistent with image intensity edges, wherein a good estimate of the background image results in a high degree of motion boundary consistency; or
  a component that measures smoothness of adjacent pixels, wherein adjacent pixels have a high degree of smoothness if the image-frames that the labeling associates with these pixels match well in the proximity of the pixel locations.

17. A computer-readable storage device storing instructions that when executed by a computer cause the computer to perform a method for determining the quality of a background image for a sequence of image frames, wherein the background image is generated by copying pixels from the sequence of image frames, the method comprising:
  computing a smoothness cost for adjacent pixels in the background image by matching regions of the image frames from which the adjacent pixels were copied; and
  determining the quality of the background image based on the smoothness cost.

* * * * *

UNITED STATES PATENT AND TRADEMARK OFFICE
CERTIFICATE OF CORRECTION

PATENT NO. : 7,574,038 B1  Page 1 of 1
APPLICATION NO. : 11/096998
DATED : August 11, 2009
INVENTOR(S) : Cohen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Seventh Day of September, 2010

David J. Kappos
*Director of the United States Patent and Trademark Office*